United States Patent [19]

Dieck et al.

[11] 4,116,891

[45] Sep. 26, 1978

[54] CATALYTIC PROCESS FOR THE PREPARATION OF PHOSPHAZENE POLYMERS

[75] Inventors: Ronald L. Dieck; Thomas B. Garrett; Alan B. Magnusson, all of Lancaster, Pa.

[73] Assignee: Armstrong Cork Company, Lancaster, Pa.

[21] Appl. No.: 747,626

[22] Filed: Dec. 6, 1976

[51] Int. Cl.$^2$ .............................................. C08G 79/02
[52] U.S. Cl. ...................................... 521/89; 423/300; 521/95; 521/189; 528/399
[58] Field of Search ............... 260/2 P, 2.5 R, 2.5 FP, 260/47 P; 423/300

[56] References Cited

U.S. PATENT DOCUMENTS

| | | | |
|---|---|---|---|
| 3,370,220 | 2/1968 | Allcock et al. | 260/2 |
| 3,443,913 | 5/1969 | Bieniek et al. | 23/357 |

OTHER PUBLICATIONS

Vale, Polyphosphonitrilic Chloride, Macromolecular Synthesis, vol. 2, pp. 91–94, 1966.

*Primary Examiner*—Lester L. Lee
*Attorney, Agent, or Firm*—Richard J. Hammond

[57] ABSTRACT

A process is disclosed for the catalytically-induced preparation of phosphazene polymers. Cyclic halophosphazenes are polymerized in the presence of a catalytically sufficient amount of a Lewis acid catalyst.

17 Claims, No Drawings

CATALYTIC PROCESS FOR THE PREPARATION OF PHOSPHAZENE POLYMERS

BACKGROUND OF THE INVENTION

1. Field of the Invention

The present invention relates to a process for the preparation of phosphazene polymers. More specifically, the present invention relates to a method for catalytically producing polyphosphazenes.

2. Description of the Prior Art

The preparation of polyphosphazenes has generally been recognized to be most readily accomplished by the techniques of Allcock et al and as disclosed in U.S. Pat. No. 3,370,020. The preparation essentially involves the use of the halogenated cyclic trimer, hexachlorocyclotriphosphazene, as the starting material in what is substantially a melt polymerization process. Purified trimer is thermally polymerized under sealed tube conditions at about 250° C. for 20 to 48 hours to yield a liner poly(dichlorophosphazene). The higher halogenated cyclic phosphazenes, such as the tetramer and the like, are also effective in this reaction. While the linear poly(dichlorophosphazene) itself is a good elastomer having high bimodal molecular weight, e.g. over one million, it suffers the severe disadvantage of undergoing relatively facile hydrolytic cleavage of the P—Cl bond, followed by degradation of the polymer. The prior art has shown that attempts to increase the stability of the dichloropolymer by continued heating have proved ineffective, a highly crosslinked rubbery material being produced, such also being hydrolytically unstable. Recent success for obtaining polyphosphazenes of good hydrolytic stability has been achieved by substituting all of the halogen on the linear halophosphazene polymer produced from the thermal polymerization of the trimer with various organic species. The following scheme discloses the state of the prior art to date in which high molecular weight polyphosphazenes also of bimodal distribution are produced by treating high molecular weight poly(dichlorophosphazene) I, with a variety of organic nucleophiles, e.g. alcohols, phenols, and amines, in order to obtain the corresponding completely substituted, hydrolytically stable polymers II, III and IVA and IVB.

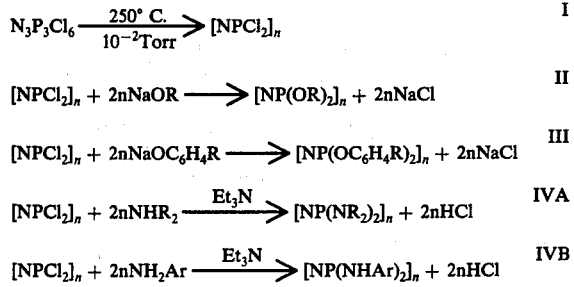

Practically, the time period for accomplishing the thermally-induced, ring-opening polymerization is economically disadvantageous, and considerable effort has been expended ascertaining what catalysts could be employed to successfully promote such reaction. A variety of investigators have found that carboxylic acids, ethers, ketones, alcohols, nitromethane and metals such as zinc, tin or sodium, enhance the rate of polymerization of the cyclic trimer. See for example, German Pat. No. 2,517,142. The rate of enhancement with carboxylic acid catalysts, for example, is such that extensive polymerization is induced in 24 hours at 210° C., compared to only 3% conversion to the linear halopolymer in the same time in the absence of any catalyst. Comparable catalytic activity has also been shown by sulfur (at 215°–254° C.), by dialkyl paracresols and by quinone or hydroquinone. See Allcock, "Phosphorus Nitrogen Compounds", Academic Press 1972, page 316 and following. Recently, alkoxide catalysts have been disclosed to be particularly effective in the catalysis of the ring-opening reaction of the cyclic halophosphazenes, giving bimodal, low molecular weight linear poly(dichlorophosphazenes) in as little as five hours at 250° C. See copending application Ser. No. 731,745, filed Oct. 6, 1976.

In attempts to ascertain the types of catalysts that would facilitate thermally-induced, ring-opening polymerization of the cyclic halogenated phosphazene, a number of studies have been conducted that have been designed to establish a mechanism for this thermally-induced polymerization process. The mechanism proposed for this reaction leads to the conclusion that reagents for facilitating the removal of a chloride ion from the phosphorus atom in the cyclic halogenated phosphazene should be active catalysts. However, a variety of compounds, including those that should be good chloride acceptors, have been found to have no effect on the ring-opening polymerization and include carbon tetrachloride, chloroform, ligroin, benzene, biphenyl, cyclohexane, ethylbromide, phosphorus pentachloride, ammonia, water, mercuric chloride, aluminum chloride, and stannic chloride.

There is, therefore, a need for effective catalysts to produce linear phosphazenes.

SUMMARY OF THE INVENTION

It is an object of the present invention to provide a novel process for the production of phosphazene polymers.

It is a further object of the present invention to provide a novel process for the production of phosphazene polymeric foams.

It is an additional object of the present invention to provide a novel process for the production of low molecular weight phosphazene polymers and foams from such low molecular weight polyphosphazenes.

It is a further object of the present invention to provide a novel process for the production of low molecular weight phosphazene polymers and foams from such low molecular weight polyphosphazenes which comprises thermally polymerizing a cyclic halophosphazene with a catalytically sufficient amount of a Lewis acid catalyst.

It is an additional object of the present invention to provide a novel process for the production of phosphazene polymers having a gaussian molecular weight distribution.

These and other objects of the present invention will become more apparent to those skilled in the art upon reading the more detailed description thereof set forth hereinbelow.

DESCRIPTION OF THE PREFERRED EMBODIMENTS

Extensive testing of a large variety of catalysts in the cyclic halophosphazene systems has disclosed that, while they vary somewhat in their activity, all catalytically active compounds, in accordance with the present invention, can be categorized as Lewis acid type catalysts. As such, Lewis acid catalysts may be defined as catalysts that influence the process of the production of phosphorus-to-nitrogen bonds and are electron-pair acceptors. The Lewis acid catalysts of particular use in these phosphazene systems are any of the Lewis acid catalysts known in the prior art, with the exception of those proton acid catalysts such as $H_2SO_4$, HF, HCl and the like. Particularly to be avoided in these catalyzed reactions are those acid catalysts known in the prior art as Bronsted acid catalysts.

In the catalytically-induced process in accordance with the present invention, phosphazene polymers can be prepared by a one-step process in which the Lewis acid catalyst is admixed with a cyclic compound of the formula $$(NPCl_2)_y$$

wherein $y$ is 3, 4, or mixtures of 3 and 4 and thermally polymerized.

It is preferred to carry out the catalytically-induced thermal polymerization by heating the phosphazene compound at a temperature and for a length of time ranging from about 5 hours at 250° C. to about 600 hours at 150° C., preferably in the absence of oxygen and most preferably in the presence of a vacuum of at least $10^{-1}$ Torr. That is to say, the compounds are heated to a temperature ranging from about 140° C. to 250° C. for about 5 hours to 600 hours, the higher temperatures necessitating shorter contact times and the lower temperatures necessitating longer contact times. At temperatures higher than 250° C., i.e. 300° C., uncontrollable crosslinking of the ring-opened material becomes significant in these catalyzed systems. The compounds must be heated for such a length of time that only a minor amount of unreacted charge material remains and substantially no crosslinked material has been produced. Such a result is generally achieved by following the conditions of temperature and contact time as specified above. Preferably, temperatures of 175°–200° C. are employed at times of 5 to 100 hours.

While the ring-opening polymerization is most advantageously carried out in the melt phase, a judicious selection of solvents can also be employed so as to effect the reaction in solution. However, the reactivity of the cyclic phosphazenes with materials having available protons is well known and the common hydrocarbon solvents, such as benzene and the like, or the high boiling solvents, such as diglyme, dimethylformamide and the like, should be avoided. When solvents are used in the ring-opening polymerization, such should be inert to any reaction with the cyclic phosphazene at the temperature of polymerization and are preferably polyhalocarbon solvents such as carbon tetrachloride, perchloroethylene and various solvents generally described as Freon solvents, but such having no available hydrogen atoms present in the molecule.

It is preferred that the catalytically-induced thermal polymerization be carried out in the presence of an inert gas such as nitrogen, neon, argon, or in a vacuum of less than about $10^{-1}$ Torr, inasmuch as the reaction proceeds very slowly in the presence of air. The use of any particular inert gas, however, is not critical.

The polymers resulting from the thermal polymerization portion of this process are in the form of a polymeric mixture of different polymers of different chain lengths. That is to say, the product of the thermal polymerization is a mixture of polymers having the formula $$+NPCl_2)_n$$

wherein $n$ ranges from about 6 to about 1300. The recovered polymer contains phosphazene polymer, preferably having a weight average molecular weight of from about 5,400 to about 382,000, as well as some unreacted starting material. The recovered polymer is, surprisingly, not the prior art mixture of polymers, generally having a molecular weight distribution that is commonly termed bimodal, e.g., having two statistical modes, but has a gaussian distribution of molecular weights, e.g., having a very small polydispersity as measured by the ratio of weight average molecular weight to number average molecular weight (Mw/Mn). Thus, in these catalytically-induced, thermally polymerized polymers, the recovered polymers preferably have weight average molecular weights of about 158,000 to 283,000 and polydispersity of less than 19.0. The uniformity in molecular weights thus achieved leads to desirable chemical and physical properties, the desirability of such well recognized in the prior art.

The amount of catalyst capable of carrying out the thermal polymerization can be very small, the minimum amount being 0.05 mole percent based on the amount of cyclic phosphazene. It is important, however, the excessive amounts of catalyst not be used in the catalytically-induced polymerization reaction. If amounts greater than 10.0 mole percent, based on cyclic phosphazene, are employed in the polymerization reaction, polymerization occurs but yielding highly crosslinked phosphazene compounds. That is to say, a range of from about 0.05 to about 10.0 mole percent is useful to induce the thermal polymerization of phosphazene cyclic trimer, tetramer, or mixtures thereof, preferably from 0.5 to 2.0 mole percent.

The catalysts effective in promoting the ring-opening polymerization of the cyclic halophosphazene materials are those particularly categorized as halide-containing Lewis acid catalysts. As such, those halides of Group I$b$ of the periodic table, such as copper, silver, and gold, both in their higher and lower valence states, are useful as catalysts in accordance with the present invention.

The Group II$b$ metallic halides such as zinc, cadmium and mercury, excluding the fluorides of these Group II$b$ halides, are effective catalysts in accordance with the present invention.

The elements of Group III$b$ of the periodic table in the form of the halides are also effective herein and are the halides of boron, aluminum, gallium, indium, and thallium. The fluorides of indium, thallium, and gallium, however, are not active herein.

Group IV$b$ halides show catalytic activity in the process in accordance with the present invention and include the silicon halides, the germanium halides (except for germanium fluoride), the tin halides, are useful herein.

Actinide halides can be used in the process in accordance with the present invention and are illustrated by those halides of thorium and uranium.

Group IV$a$ halides useful in accordance with the present invention include those of titanium, zirconium and hafnium. Zirconium tetrafluoride and hafnium tetrafluoride have, however, limited catalytic use.

Group Va halides useful in accordance with the present invention include those of niobium, tantalum, and vanadium.

Group Vb halides useful in accordance with the present invention include those of arsenic, antimony and bismuth. The halides of phosphorus, however, provide little catalytic activity herein.

Group VIb halides useful in accordance with the present invention are those of selenium and tellurium.

Group VIa halides useful herein are those of chromium, molybdenum, and tungsten.

Group VIIa halides useful herein are those of manganese, and rhenium.

Group VIII halides comprising those of iron, ruthenium, osmium, cobalt, rhenium, iridium, nickel, platinum, and palladium are all effective catalysts in the polymerization of the cyclic halogenated phosphazene starting material.

The lanthanide (rare earth) halides active herein are cerium, neodymium and lanthanum.

Non-halide containing Lewis acids such as metal alkyls, e.g., trialkyl aluminum and the boron alkyls may also be used herein. Various acidic oxides and sulfides (the acidic chalcides) have also proved of use in accordance with the present invention. Representative of the acidic chalcides are beryllium oxide, chromium oxide, titanium oxide, thorium oxide, aluminum sulfate, aluminum oxide.chromium oxide, aluminum oxide.ferric oxide, aluminum oxide.cobalt oxide, aluminum oxide.manganese oxide, aluminum oxide.molybdenum oxide, aluminum oxide.vanadium oxide, chromium oxide.ferric oxide, aluminum sulfide including the disulfide and trisulfide.

While the above-disclosed catalysts are set forth as being individually useful in the process in accordance with the present invention, mixtures of any of the above can also be used herein.

The exact phenomenon which occurs when polymerizing the cyclic phosphazene starting material used to produce the phosphazene polymers in accordance with the present invention is not completely understood. It is known, however, that the initiation step in the polymerization of $(NPCl_2)_y$ wherein $y$ is 3 or 4 is the heterolytic cleavage of a phosphorus-chlorine bond to produce a cyclic phosphazene cation in accordance with the following equation.

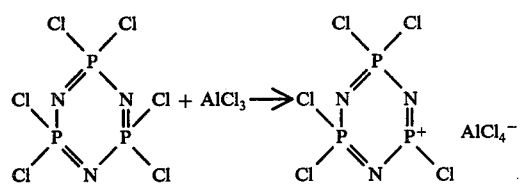

VI

Cation (VI) then electrophilically attacks a neutral $(NPCl_2)_y$ molecule, cleaving its ring and commencing the propagation step in the polymerization reaction as follows:

VI

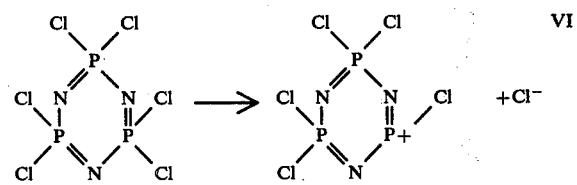

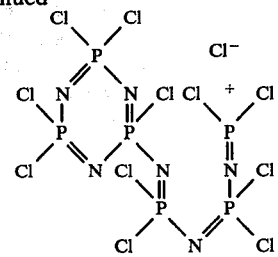

While we do not wish to be bound by any explanation of the catalytically-induced thermal polymerization mechanism or theory in regard thereto, it is possible that the catalysts in accordance with the present invention are those which facilitate the formation of a cyclic cation initiator, that is, other reagents that are similar to (VI) but which form more readily than do cyclic cation (VI). Thus, by such reasoning, a class of additives which function in this manner would be those catalysts capable of extracting a chloride ion, e.g. it would be an electron-pair acceptor, from the cyclic starting material by the classical mechanism shown below with aluminum chloride.

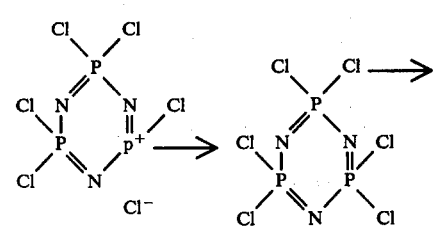

Thus, the thermally-induced removal of chloride ion from the cyclic halophosphazene is facilitated at lower temperatures to effect the polymerization reaction. In accordance with this proposed mechanism, the presence of any proton-bearing acid, such as HCl, $HNO_3$ and the like, is detrimental and causes the above reaction scheme to lie heavily to the left (the proton readily associates with $AlCl_4$ anion). This, of course, effectively diminishes any catalytically-induced polymerization that would occur. The proton-containing Lewis acids, e.g., Bronsted acids, are, therefore, ineffective in catalyzing this cyclic chlorophosphazene ring-opening polymerization reaction.

Preferably, the metal halide Lewis acid catalysts useful in accordance with the present invention are beryllium chloride, cadmium chloride, aluminum chloride, aluminum bromide, zinc chloride, boron trifluoride, boron trichloride, boron tribromide, hafnium tetrachloride, gallium chloride, gallium bromide, zinc chloride, titanium tetrachloride, titanium tetrabromide, indium trichloride, zirconium tetrachloride, tin tetrachloride, tin tetrabromide, antimony pentachloride, antimony trichloride, bismuth trichloride, iron trichloride, uranium tetrachloride, and mixtures thereof.

While a large variety of catalysts are set forth above, any of the non-protonated Lewis acid-type catalysts are effective in the process in accordance with the present invention. To set forth in any greater detail all of these catalysts would require extensive listing. Accordingly, those Lewis acid catalysts shown in Olah, Friedel-Crafts and Related Reactions, Volumes I through IV, Interscience, John Weily & Sons, 1963, are useful herein.

As a second step in the process in accordance with the present invention, thermally stable, water-resistant phosphazene polymers substantially free of halogen are produced from the above-mentioned catalytically formed phosphazene polymer by reaction with specific reagents. These reagents have the formulas:

$$M(OC_6H_4-R_1)_x,$$

$$M(OC_6H_4-R_2)_x,$$

and, if desired, $$M(W)_x$$

wherein M is a Group I or Group II metal of the Periodic Table such as lithium, sodium, potassium, magnesium or calcium, $x$ is equal to the valence of the metal M, and $R_1$ and $R_2$ can be the same or different and are alkyl radical having from 1 to 10 carbon atoms, alkoxy having from 1 to 4 carbon atoms, aryl radical having from 6 to 10 carbon atoms, substituted $C_1$ to $C_{10}$ alkyl radical or substituted $C_6$ to $C_{10}$ aryl radical, the substituents being halogen, nitro, cyano, $C_1$ to $C_4$ alkyl, $C_1$ to $C_4$ alkoxy, $C_6$ to $C_{10}$ aryl, or $C_6$ to $C_{10}$ aryloxy radicals. The W represents a group capable of crosslinking chemical reaction, such as, the groups unsaturated aliphatic, unsaturated flouroaliphatic, aromatic-containing unsaturated aliphatic or unsaturated fluoroaliphatic and perfluoroaromatic-containing unsaturated aliphatic or unsaturated fluoroaliphatic, the groups attached to the phosphorous atom of the P=N polymer by an —O— linkage. Preferably W is an ethylenically unsaturated, monovalent radical containing a group capable of further reaction at relatively moderate temperatures and the ratio of $W:R_2 + R_2$ is less than about 1:5. For the sake of simplicity, when copolymers are referred to herein, these may be represented by the formula $[NP(OC_6H_4R_1)_a(OC_6H_4R_2)_b(W)_c]_n$ wherein W, $R_1$, $R_2$, and $n$ are as set forth above and wherein $a + b + c = 2$ and $b \geq 0$ and/or $c \geq 0$. When $b=0$, $a + c = 2$ and $c=0$, $a + b = 2$. Examples of W are $OCH_2$—CH=$CH_2$; —$OR_3CH$=$CH_2$; —$OC(R_3)$=$CH_2$; $OR_3CF$=$CF_2$ and similar groups which contain unsaturation, wherein $R_3$ is any aliphatic or aromatic radical, especially $C_2$ to $C_{10}$ alkylene. These groups are capable of further reaction at moderate temperatures (for example, 200°–350° F.) in the presence of free radical initiators, conventional sulfur curing or vulcanizing additives known in the rubber art or other reagents, often even in the absence of accelerators, using conventional amounts, techniques and processing equipment. Examples of free radical initiators include benzoyl peroxide, bis(2,4-dichlorobenzoyl peroxide), di-t-butyl peroxide, dicumyl peroxide, 2,5-dimethyl(2,5-di-t-butylperoxy)hexane, t-butyl perbenzoate, 2,5-dimethyl-2,5-di(t-butylperoxy)heptyne-3, and 1,1-bis(t-butylperoxy)-3,3,5-trimethylcylohexane. Thus, the general peroxide classes which may be used for crosslinking include diacyl peroxides, peroxyesters, and dialkyl peroxides.

Examples of sulfur-type curing systems include vulcanizing agents such as sulfur, sulfur monochloride, selenium disulfide, tellurium disulfide, thiuram disulfide, p-quinone dioximes, polysulfide polymers, and alkyl phenol sulfides. The above vulcanizing agents may be used in conjunction with accelerators, such as aldehyde amines, thio carbamates, thiuram sulfides, guanidines, and thiazols, and accelerator activators, such as zinc oxide or fatty acids, e.g., stearic acid.

It is also possible to use as W in the above formulas, monovalent radicals represented by the formula —$OSi(OR^4)_2R^5$ and other similar radicals which contain one or more reactive groups attached to silicon. Other reactive radicals are those containing —NH or $NH_2$ functionality such as —$R'$—N(H)—$R''$, —$R'''$—$NH_2$, and —$CH_2CH_2XCH_2NHCH_2CH_2$ wherein $R'$ is $(CH_2)_A$ or —$C_6H_4(CH_2)_A$ where A is an integer from 1 to 4 and wherein X represents —CH— or —N—, $R''$ represents lower alkyl with up to 4 carbon atoms; $R'''$ represents alkyl, aryl, aralkyl, alkylaryl, and the aryl group is carbocyclic or heterocyclic. In these radicals $R^4$, $R^5$ and $R^6$ each represent aliphatic, aromatic and acyl radicals. Like those groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833; and 3,844,983, which are hereby incorporated by reference.

Aliphatic substituted aryloxyphosphazene homopolymers, as disclosed in accordance with the present invention, have higher smoke and lower foamability than alkoxy substituted aryloxyphosphazene homopolymers. Similarly, in substituted aryloxyphosphazene copolymers, the ratio of $a:b$ and of $(a+b):c$ in those copolymers containing W also affects processability, smoke production and other physical properties. For example, it has been found that when $R_1$ and $R_2$ are the same and are alkyl, highly crystalline polymers are formed which have higher smoke, and when compounded in foam compositions, show diminished foaming. When $R_1$ and $R_2$ are the same and are long alkyl chains, e.g. $C_5$-$C_{10}$, a phosphazene homopolymer is formed that is soft, easily processed, and less crystalline than the aromatic homopolymers. Further, these polymers exhibit good foamability and low smoke. In the phosphazene copolymers herein (where $R_1$ and $R_2$ are different) and are, for example alkoxy and alkyl, respectively, the ratios of $a:b$ and $(a+b):c$ in copolymers containing W also affect processing properties, foamability and smoke. Thus, when the mole percent of $R_2$ as alkyl decreases, i.e. as more $R_1$ alkoxy is substituted on the aryloxy group attached to the phosphazene chain, the amount of smoke decreases, the processing becomes more difficult and the foamability diminishes. When W is present, it has been found that when the mole percent of W increases, the degree of crosslinking increases and the ability to be foamed diminishes. Accordingly, it is contemplated that when copolymers are used in accordance with the present invention, and when $R_1$ or $R_2$ is alkoxy having from 1 to 8 carbon atoms, a mole ratio of $a:b$ of at least 1:6 and up to about 6:1, and preferably between about 1:4 and 4:1, are used. It is also contemplated that the mole ratios of $c:(a=b)$ for copolymers or $c:a$ in polymers where $R_1 = R_2$ will be less than about 1:5, preferably from about 1:50 to about 1:10.

The polymer mixture is reacted with the above compound or mixture of metal compounds at a temperature and a length of time ranging from about 25° C. for 7 days to about 200° C. for 3 hours.

Again, as in regard to the polymerization step mentioned above, the polymer mixture is reacted with the alkali or alkaline earth metal compound or compounds at a temperature ranging from about 25° C. to about 200° C. for from about 3 hours to about 7 days, the lower temperatures necessitating the longer reaction times and the higher temperatures allowing shorter reaction times. These conditions are, of course, utilized in order to obtain the most complete reaction possible, i.e., in order to insure the complete conversion of all chlorine atoms in the polymer mixture to the corresponding ester of the alkali or alkaline earth starting materials.

The above esterification step is carried out in the presence of a solvent. The solvent employed in the esterification step must have a relatively high boiling point (e.g., about 115° C., or higher) and should be a solvent for both the polymer and the alkali or alkaline earth metal compounds. In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The amount of alkali metal or alkaline earth metal compound or mixtures thereof employed should be at least molecularly equivalent to the number of available chlorine atoms in the polymer mixture. However, it is preferred that an excess of the metal compound be used in order to assure complete reaction of all the available chlorine atoms. Generally, for copolymers the ratio of the individual alkali metal or alkaline earth metal compounds in the combined mixture governs the ratio of the groups attached to the polymer backbone. However, those skilled in the art readily will appreciate that the nature and, more particularly, the steric configuration of the metal compounds employed may effect their relative reactivity. Accordingly, the ratio of $R_1$'s and $R_2$'s in the esterified product, if necessary, may be controlled by employing a stoichiometric excess of the slower reacting metal compound.

Examples of alkali or alkaline earth metal compounds which are useful in the process of the present invention include:

sodium phenoxide
potassium phenoxide
sodium p-methoxyphenoxide
sodium o-methoxyphenoxide
sodium m-methoxyphenoxide
lithium p-methoxyphenoxide
lithium o-methoxyphenoxide
lithium m-methoxyphenoxide
potassium p-methoxyphenoxide
potassium o-methoxyphenoxide
potassium m-methoxyphenoxide
magnesium p-methoxyphenoxide
magnesium o-methoxyphenoxide
magnesium m-methoxyphenoxide
calcium p-methoxyphenoxide
calcium o-methoxyphenoxide
calcium m-methoxyphenoxide
sodium p-ethoxyphenoride sodium o-ethoxyphenoride
sodium m-ethoxyphenoride
potassium p-ethoxyphenoxide
potassium o-ethoxyphenoxide
potassium m-ethoxyphenoxide
sodium p-n-butoxyphenoxide
sodium m-n-butoxyphenoxide
lithium p-n-butoxyphenoxide
lithium m-n-butoxyphenoxide
potassium p-n-butoxyphenoxide
potassium m-n-butoxyphenoxide
magnesium p-n-butoxyphenoxide
magnesium m-n-butoxyphenoxide
calcium p-n-butoxyphenoxide
calcium m-n-butoxyphenoxide
sodium p-n-propoxyphenoxide
sodium o-n-propoxyphenoxide
sodium m-n-propoxyphenoxide
potassium p-n-propoxyphenoxide
potassium o-n-propoxyphenoxide
potassium m-n-propoxyphenoxide
sodium p-methylphenoxide
sodium o-methylphenoxide
sodium m-methylphenoxide
lithium p-methylphenoxide
lithium o-methylphenoxide
lithium m-methylphenoxide
sodium p-ethylphenoxide
sodium o-ethylphenoxide
sodium m-ethylphenoxide
potassium p-n-propylphenoxide
potassium o-n-propylphenoxide
potassium m-n-propylphenoxide
magnesium p-n-propylphenoxide
sodium p-isopropylphenoxide
sodium o-isopropylphenoxide
sodium m-isopropylphenoxide
calcium p-isopropylphenoxide
calcium o-isopropylphenoxide
calcium m-isopropylphenoxide
sodium p-sec butylphenoxide
sodium m-sec butylphenoxide
lithium p-sec butylphenoxide
lithium m-sec butylphenoxide
lithium p-tert. butylphenoxide
lithium m-tert. butylphenoxide
potassium p-tert. butylphenoxide
potassium m-tert. butylphenoxide
sodium p-tert. butylphenoxide
sodium m-tert. butylphenoxide
sodium propeneoxide
sodium p-nonylphenoxide
sodium m-nonylphenoxide
sodium o-nonylphenoxide
sodium 2-methyl-2-propeneoxide
potassium buteneoxide
and the like.

The second step of the process results in the production of a homopolymer having the formula

or a copolymer mixture having the formula

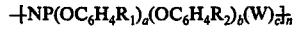

wherein $n$, $R_1$, $R_2$ and W are as specified above, where $c$ and $b$ can be 0, and where $a + b + c = 2$, and the corresponding metal chloride salt. It should be noted herein that these polymers do not have the bimodal molecular weight distribution characteristic of the non-Lewis acid catalyzed, ring-opened, halogen-containing polymer and are of gaussian distribution with an Mw/Mn of less than 19.

The polymeric reaction mixture resulting from the second or esterification step is then treated to remove the salt which results upon reaction of the chlorine atoms of the polymer mixture with the metal of the alkali or alkaline earth metal compounds. The salt can be removed by merely precipitating it out and filtering, or it may be removed by any other applicable method, such as by washing the reaction mixture with water after neutralization thereof with, for example, an acid such as hydrochloric acid.

The novel phosphazene polymers of this invention, as mentioned above, are very thermally stable. They are soluble in specific organic solvents such as tetrahydrofuran, benzene, xylene, toluene, dimethylformamide and the like and can be formed into films from solutions of the copolymers by evaporation of the solvent. Significantly, they are water resistant at room temperature and do not undergo hydrolysis at high temperatures. The polymers may be used to prepare films, fibers, coatings, molding compositions and the like. They may be blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., without detracting from the scope of the present invention.

The homopolymers and copolymers may be used to prepare foamed products which exhibit excellent fire retardance and which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temperature Range ° C. |
|---|---|
| Azobisisobutyronitrile | 105–120 |
| Azo dicarbonamide(1,1-azobisform-amide) | 100–200 |
| Benzenesulfonyl hydrazide | 95–100 |
| N,N'-dinitroso-N,N'-dimethyl terephthalamide | |
| Dinitrosopentamethylenetetramine | 130–150 |
| Ammonium carbonate | 58 |
| p,p'-oxybis-(benzenesulfonyl-hydrazide) | 100–200 |
| Diazo aminobenezene | 84 |
| Urea-biuret mixture | 90–140 |
| 2,2'-azo-isobutyronitrile | 90–140 |
| Azo hexahydrobenzonitrile | 90–140 |
| Diisobutylene | 103 |
| 4,4'-diphenyl disulfonylazide | 100–130 |

Typical foamable formulations include:

| Phosphazene copolymer (e.g., $[N P (OC_6H_5) (OC_6H_4\text{-p-}OCH_3)]_n$ | |
|---|---|
| | 100 parts |
| Filler (e.g., alumina trihydrate) | 0–100 phr |
| Stabilizer (e.g., magnesium oxide) | 2.5–10 phr |
| Processing aid (e.g., zinc stearate) | 2.5–10 phr |
| Plasticizer resin (e.g., Cumar P-10, | |

| —continued | |
|---|---|
| Phosphazene copolymer (e.g., $[N P (OC_6H_5) (OC_6H_4\text{-p-}OCH_3)]_n$ | |
| | 100 parts |
| coumarone indene resin) | 0–50 phr |
| Blowing agent (e.g., 1,1'-azobisformamide) | 10–50 phr |
| Activator (e.g., oil-treated urea) | 10–40 phr |
| Peroxide curing agent (e.g., 2,5-dimethyl-2,5-di(t-butylperoxy)hexane) | 2.5–10 phr |
| Peroxide curing agent (e.g., benzoyl peroxide) | 2.5–10 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 100°–120° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy)hexane, and partially precuring in a closed mold for about 6–30 minutes at 200°–250° F., followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial precure" foaming technique is that an increase in the molecular weight of the foamable polymer prior to the foaming step enables better control of pore size and pore uniformity in the foaming step. The extent of "precure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the glass transition temperature of the copolymer employed in the foam formulation, that is to say, the lower the glass transition of the copolymer the more flexible will be the foam produced therefrom. As indicated, inert, reinforcing or other fillers such as alumina trihydrate, hydrated silicas or calcium carbonate can be added to the copolymer foams and the presence of these and other conventional additives should in no way be construed as falling outside the scope of this invention.

Also, as mentioned above, the homopolymers and copolymers of this invention can be crosslinked at moderate temperatures by conventional free radical curing techniques and in copolymers with minor amounts of unsaturated groups W present in the copolymer backbone with conventional sulfur curing techniques. The ability of these polymers to be cured at temperatures below about 350° F. makes them particularly useful as potting and encapsulation compounds, sealants, coatings and the like. The copolymers are also useful for preparing crosslinked foams which exhibit significantly increased tensile strengths over uncured foams. These copolymers are often crosslinked in the presence of inert, reinforcing or other fillers and the presence of these and other conventional additives are deemed to be within the scope of this invention.

The following examples are set forth for purposes of illustration only and are not to be construed as limitations of the present invention except as set forth in the appended claims. All parts and percentages are by weight unless otherwise indicated.

EXAMPLE 1

Polymerization of $(NPCl_2)_3$ in Presence of $AlCl_3$

To a 15 ml tared pyrex glass polymerization tube was added 0.054 g anhydrous aluminum chloride, $AlCl_3$ and 7.4 g hexachlorocyclotriphosphazene, $(NPCl_2)_3$, which had been purified by crystallization from heptane and distillation. The concentration of $AlCl_3$ was 0.72 weight percent or 1.90 mole percent. The above operations were carried out in a nitrogen-filled dry box. The tube containing trimer and catalyst was connected to a vacuum pump and evacuated for 30 minutes to $10^{-2}$ Torr, then sealed off while still under vacuum. The tube was heated in an oven at 175° C. for 60 hours, at which time the viscosity had increased until the material would barely flow when the tube was inverted at the reaction temperature.

EXAMPLE 2

Preparation of poly bis(p-isopropylphenoxy)phosphazene

The tube of poly(dichlorophosphazene) prepared in Example 1 was opened in the dry box and the contents dissolved in 300 ml toluene. This toluene solution of $(NPCl_2)_n$ was added dropwise to a stirred solution of sodium p-isopropylphenoxide (previously prepared by the reaction of 3.4 g, 0.150 moles sodium with 20.9 g, 0.153 moles p-isopropylphenol in 175 ml diglyme). The reaction solution was then heated with stirring at 115° for 70 hours. After cooling to 85°, the reaction mixture was poured into 1500 ml methanol to precipitate the polymer. After 2 hours stirring, the methanol was decanted and replaced with fresh methanol for an additional 65 hours. The methanol was then replaced with water and allowed to stand overnight. The water was decanted, the polymer rinsed with methanol, and vacuum dried. The yield of dry poly bis(p-isopropylphenoxy)phosphazene was 31.3%, based on the original hexachlorocyclotriphosphazene. After further purification by dissolving in THF and precipitating into water and drying, GPC analysis showed a nearly gaussian distribution with a Mw of 170,000 and a Mw/Mn value of 7.8.

EXAMPLE 3

Example 1 was repeated. However, polymerization of the trimer was carried out at 200° C. for 14 hours.

Control Experiment on $(NPCl_2)_3$

A control sample of $(NPCl_2)_3$ without added catalyst treated in the same way as Example 3 showed no apparent increase in viscosity after 350 hours at 200° C.

EXAMPLE 4

Terpolymer $[NP(OC_6H_4{-}4{-}OCH_3)_{0.97}(OC_6H_4{-}4{-}Cl)_{0.97}(OCH_2CH_2CH_2CH{=}CH_2)_{0.06}]_n$ The poly(dichlorophosphazene) prepared in Example 3 was dissolved in a mixture of toluene and THF (4:1 by volume). To this solution of $(NPCl_2)_n$ was added dropwise a diglyme solution of sodium p-methoxyphenoxide, sodium p-chlorophenoxide and sodium 4-pentene-1-oxide (in the molar proportion of 48.5:48.5:3) which had been previously prepared from sodium metal and the corresponding hydroxide compounds. The reaction solution was then heated to distill off low boiling solvent until a temperature of 115° was reached. Heating at this temperature with stirring was continued for 48 hours. After cooling to 90°, the reaction mixture was poured into methanol and stirred for two hours. The methanol was decanted from the polymer and replaced with fresh methanol and allowed to stand 24 hours. Methanol was then replaced with water and let stand overnight. The water was then poured off and the polymer rinsed with methanol and dried under vacuum. The yield of dry terpolymer was 66.3% based on $(NPCl_2)_3$.

EXAMPLE 5

Copolymer $[NP(OC_6H_5)(OC_6H_4{-}4{-}secBu)]_n$

Poly(dichlorophosphazene) prepared as in Example 3 was dissolved in toluene-THF as in Example 4. To this solution was added dropwise a diglyme solution of equimolar amounts of sodium phenoxide and sodium p-secondary butylphenoxide, prepared from the reaction of sodium metal with the corresponding phenols. After distilling off solvent until the pot temperature reached 115°, the reaction was heated at this temperature for 70 hours. The polymer was isolated as described in Example 4. Yield of dry copolymer was 17% based on $(NPCl_2)_3$.

The following table illustrates the variety of Lewis acid catalysts capable of effecting the polymerization of hexachlorocyclotriphosphazene. All reactions disclosed are two-step sequences involving the initial catalytically-induced, ring-opening polymerization of the cyclic trimer to yield poly(dichlorophosphazene) as illustrated in Example 1. To facilitate characterization, this material is reacted with sodium p-isopropylphenoxide, e.g. the column Aryloxy-Substituted Polymer, except where otherwise indicated. This reaction is illustrated in Example 2.

| Example | Lewis Acid Catalyst | Mole % Catalyst | Polymerization Temp. ° C. | Time Hours | Aryloxy-Substituted Polymer | | |
|---|---|---|---|---|---|---|---|
| | | | | | Yield | Mw | Mw/Mn |
| 6 | $AlCl_3$ | 3.8 | 150 | 112 | 8.4 | Not Determined | — |
| 1&2 | " | 1.90 | 175 | 60 | 31.3 | 170,000 | 7.78 |
| 7 | " | 0.50 | 200 | 50 | 77.2 | 261,000 | 18.6 |
| 8 | " | 1.00 | 200 | 37 | 73.4 | 175,000 | 7.4 |
| 9 | " | 1.33 | 200 | 19 | 77.4 | 283,000 | 15.9 |
| 10 | " | 1.90 | 200 | 12 | 68.9 | 233,000 | 9.2 |
| 3&4 | " | 1.90 | 200 | 14 | 66.3 | Not Determined | — |
| 5 | " | 1.90 | 200 | 12 | 17.0 | Not Determined | — |
| 11 | " | 0.1 | 250 | 9.5 | 28.0 | Not Determined | — |

-continued

| Example | Lewis Acid Catalyst | Mole % Catalyst | Polymerization Temp. °C. | Time Hours | Aryloxy-Substituted Polymer | | |
|---|---|---|---|---|---|---|---|
| | | | | | Yield | Mw | Mw/Mn |
| 12 | AlBr$_3$ | 1.0 | 200 | 29 | 79.1 | 277,000 | 16.5 |
| 13 | " | 1.9 | 200 | 12 | 61.5 | Not Determined | — |
| 14 | GaCl$_3$ | 1.0 | 200 | 37 | 75.7 | 190,000 | 10.6 |
| 15 | " | 1.9 | 200 | 9 | 69.6 | 165,000 | 5.74 |
| 16 | HfCl$_4$ | 1.0 | 200 | 220 | 52.4 | Not Determined | — |
| 17 | " | 1.9 | 200 | 85 | 61.8 | 158,000 | 10.0 |
| 18 | InCl$_3$ | 1.9 | 200 | 342 | 59.8 | Not Determined | — |
| 19 | LaCl$_3$ | 1.9 | 200 | 563 | 28.0 | Not Determined | — |
| 20 | ZnCl$_2$ | 1.9 | 200 | 581 | 31.0 | Not Determined | — |

EXAMPLE 21

To 100 parts of the copolymer prepared in accordance with Example 5, there were added 100 parts of alumina trihydrate, 5 parts of magnesium oxide, 10 parts of zinc stearate, 2 parts of CUMAR P-10 (p-coumarone-indene resin), 20 parts of Celogen AZ (1,1'-azobisformamide), 5 parts of BIK-OT (an oil treated urea) as an activator, 6 parts of 2,5-dimethyl-2,5-di(t-butyl peroxy)-hexane, 2 parts of benzoyl peroxide (78% active), and 1 part of dicumyl peroxide. The above ingredients were milled to insure homogeneous mixing of all materials and were then precured in an open sided mold for 1 minute at 210° F. under 2000 psi. The precured copolymer was then free expanded in a circulating air oven for 30 minutes at 300° F. The resultant foam was light tan and flexible, having a foam density of 9.1 pounds/ft.$^3$.

What is claimed is:

1. A process for preparing a phosphazene polymer which comprises heating for 5 to 600 hours a cyclic compound of the formula (NPCl$_2$)$_y$ wherein $y$ is 3,4, or mixtures thereof at 150°–250° C. in an inert atmosphere with a catalytically sufficient amount of a halide-containing Lewis acid catalyst selected from the group halides of Group I$b$, halides of Group II$b$, halides of Group III$b$, halides of Group IV$b$, actinide halides, halides of Group IV$a$, halides of Group V$a$, halides of Group V$b$, halides of Group VI$b$, halides of Group VI$a$, halides of Group VII$a$, halides of Group VIII, lanthanide halides and mixtures thereof; a non-halide containing Lewis acid catalyst selected from the group metal alkyls, acidic chalcides, and mixtures thereof; or mixtures thereof.

2. A process in accordance with claim 1 wherein said phosphazene polymer is heated with 0.05 to 10.0 mole percent of said catalyst.

3. The process in accordance with claim 1 wherein said cyclic compound is hexachlorocyclotriphosphazene or octochloro cyclotetraphosphazene.

4. The process in accordance with claim 2 wherein said heating is at a temperature of from about 175° C. to about 250° C. for a time from about 5 hours to about 300 hours.

5. The process in accordance with claim 1 wherein said halide containing Lewis acid catalyst is selected from the group consisting of beryllium chloride, cadmium chloride, aluminum chloride, aluminum bromide, zinc chloride, boron trifluoride, boron trichloride, boron tribromide, hafnium tetrachloride, gallium chloride, gallium bromide, titanium tetrachloride, titanium tetrabromide, indium trichloride, zirconium tetrachloride, tin tetrachloride, tin tetrabromide, antimony pentachloride, antimony trichloride, bismuth trichloride, iron trichloride, uranium tetrachloride, lanthanum trichloride, and mixtures thereof.

6. The process in accordance with claim 5 wherein said Lewis acid is selected from the group consisting of aluminum chloride, aluminum bromide, gallium chloride, hafnium chloride, indium chloride and zinc chloride.

7. The process in accordance with claim 6 wherein said thermal polymerization is carried out from about 175° C. to about 250° C. for from about 5 hours to about 300 hours, said catalyst in 0.5 to 2.0 mole percent based on cyclic phosphazene.

8. The process in accordance with claim 1 wherein the catalytically formed phosphazene polymer is contacted with a metal compound having the formula $M(OC_6H_4R_1)_x$

$M(OC_6H_4R_2)_x$ or mixtures thereof wherein M is an alkali metal or alkaline earth metal, $x$ is equal to the valence of said metal M, and $R_1$ and $R_2$ are the same or different and are selected from the group consisting of $C_1$ to $C_{10}$ alkyl radical, $C_6$ to $C_{10}$ aryl radical, substituted $C_1$ to $C_{10}$ alkyl radical and substituted $C_6$ to $C_{10}$ aryl radical, the substituent selected from the group consisting of halogen, nitro, cyano, $C_1$ to $C_4$ alkyl, $C_1$ to $C_4$ alkoxy, $C_6$ to $C_{10}$ aryl and $C_6$ to $C_{10}$ aryloxy radicals, thereby forming a phosphazene polymer substantially free of halogen.

9. The process in accordance with claim 8 wherein the catalytically formed phosphazene polymer is additionally contacted with a metal compound having the formula $M(W)_x$ wherein M and $x$ are as previously defined and W is a monovalent radical being attached to the phosphorous of the —P=N— polymer by an —O— linkage selected from the group unsaturated aliphatic, unsaturated fluoroaliphatic, aromatic-containing unsaturated aliphatic or unsaturated fluoroaliphatic and perfluoroaromatic-containing unsaturated aliphatic or unsaturated fluoroaliphatic; the nitrogen-containing radicals —R'—N(H)—R", —R'''—NH$_2$, or —CH$_2$CH$_2$XCH$_2$NHCH$_2$CH$_2$ wherein R' is (CH$_2$)$_A$ or C$_6$H$_4$(CH$_2$)$_A$ wherein A is an integer from 1 to 4 and wherein X represents —CH— or —N—, R" represents lower alkyl with up to 4 carbon atoms and R''' represents alkyl, aryl, aralkyl, alkylaryl and the aryl group is carbocyclic or heterocyclic; and the silicon-containing radicals —OSi(OR$^4$)$_2$R$^5$ wherein R$^4$ and R$^5$ represent aliphatic, aromatic, and acyl.

10. The process in accordance with claim 9 wherein R$_1$ and R$_2$ are the same or different and are selected from the group consisting of $C_1$ to $C_{10}$ alkyl, and $C_1$ to $C_4$ alkoxy and W is selected from the group consisting of OCH$_2$—CH = CH$_2$, —OR$_3$CH = CH$_2$, —OC(R$_3$) = CH$_2$ and —OR$_3$CF = CF$_2$ wherein R$_3$ is $C_2$ to $C_{10}$ alkylene.

11. The process in accordance with claim 9 wherein said phosphazene polymer, substantially free of halogen, is a homopolymer of the formula —NP-(OC$_6$H$_4$R$_1$)]$_n$ or a copolymer of the formula —NP-(OC$_6$H$_4$R$_1$)$_a$(OC$_6$H$_4$R$_2$)$_b$(W)$_c$]$_n$ wherein (OC$_6$H$_4$R$_1$):(OC$_6$H$_4$R$_2$) is from 1:6 to 6:1 and W:[(OC$_6$H$_4$R$_1$)+(OC$_6$H$_4$R$_2$)] is less than 1:5 and R$_1$ and R$_2$ are different, $n$ is from 6 to 1300, $b \geq 0$, $c \geq 0$ and $a+b+c = 2$ when $b$ or $c = 0$.

12. The process in accordance with claim 11 wherein said phosphazene polymer, substantially free of halogen, is cured by heating at a temperature of from 200°–350° F. with peroxide-type curing agents consisting essentially of diacyl peroxides, peroxyesters and dialkyl peroxides.

13. The process in accordance with claim 11 wherein said phosphazene polymer, substantially free of halogen having W present, is cured by heating at a temperature of from 200°–350° F. with sulfur-type vulcanizing agents.

14. The process in accordance with claim 8 wherein said phosphazene polymer, substantially free of halogen, is mixed with a chemical blowing agent and the mixture formed therefrom is heated to a temperature sufficient to decompose said blowing agent.

15. The process in accordance with claim 14 wherein said blowing agent is 1,1'-bisazoformamide.

16. The process in accordance with claim 8 wherein said phosphazene polymer, substantially free of halogen is mixed with a chemical blowing agent and a mixture of sulfur-type vulcanizing agents or peroxide curing agents, at least one of said curing agents having an initiation temperature below the temperature at which said chemical blowing agent decomposes; heating the foamable mass to a temperature below the decomposition temperature of said blowing agent, but above the initiation temperature of at least one of said curing agents, for a sufficient time to partially precure the copolymers; and heating the partially precured mass to a temperature above the decomposition temperature of said blowing agent to foam the copolymers and to effect a further cure thereof.

17. The process of claim 16 wherein the partial precure is accomplished by heating the foamable mass for about 6 to about 30 minutes at a temperature of from about 200° F. to about 250° F., and the foaming and further curing is accomplished by heating the partially precured mass for about 30 to about 60 minutes at a temperature of from about 300° F. to about 350° F.

* * * * *